US012655325B2

(12) United States Patent
Littunen et al.

(10) Patent No.: US 12,655,325 B2
(45) Date of Patent: Jun. 16, 2026

(54) POLYMER-COATED CELLULOSIC RELEASE LINER BASE MATERIAL

(71) Applicant: UPM-Kymmene Corporation, Helsinki (FI)

(72) Inventors: Kuisma Littunen, Lappeenranta (FI); Harri Kosonen, Lappeenranta (FI); Jaakko Rautalahti, Tampere (FI); Janne Antila, Hämeenlinna (FI); Mikko Rissanen, Espoo (FI)

(73) Assignee: UPM-Kymmene Corporation, Helsinki (FI)

( * ) Notice: Subject to any disclaimer, the term of this patent is extended or adjusted under 35 U.S.C. 154(b) by 482 days.

(21) Appl. No.: 18/024,533

(22) PCT Filed: Sep. 17, 2020

(86) PCT No.: PCT/FI2020/050599
§ 371 (c)(1),
(2) Date: Mar. 3, 2023

(87) PCT Pub. No.: WO2022/058642
PCT Pub. Date: Mar. 24, 2022

(65) Prior Publication Data
US 2024/0279513 A1      Aug. 22, 2024

(51) Int. Cl.
*B32B 9/00* (2006.01)
*C09J 7/40* (2018.01)

(52) U.S. Cl.
CPC .............. *C09J 7/405* (2018.01); *C09J 7/401* (2018.01); *C09J 2301/312* (2020.08); *C09J 2301/41* (2020.08); *C09J 2301/50* (2020.08); *C09J 2423/105* (2013.01)

(58) Field of Classification Search
CPC ........................................................ C09J 7/401
USPC ......................................................... 428/408
See application file for complete search history.

(56) References Cited

U.S. PATENT DOCUMENTS

| | | | |
|---|---|---|---|
| 4,398,985 A | 8/1983 | Eagon | |
| 6,756,095 B2 * | 6/2004 | Sandt | G09F 3/10 |
| | | | 428/347 |
| 2005/0153110 A1 | 7/2005 | Juby et al. | |

(Continued)

FOREIGN PATENT DOCUMENTS

| | | |
|---|---|---|
| EP | 2947103 A1 | 11/2015 |
| WO | 2009147283 A1 | 12/2009 |

OTHER PUBLICATIONS

Gimenez et al., "Unsaturatedmodified poly(vinyl alcohol). Crosslinking through double bonds", Polymer, vol. 40, 1999; pp. 2759-2767.

(Continued)

*Primary Examiner* — Daniel H Miller
(74) *Attorney, Agent, or Firm* — Nixon Peabody LLP

(57) ABSTRACT

The invention relates to a polymer-coated cellulosic substrate (S2) for a release liner (REL1), comprising a cellulosic support layer (PAP1), a first coating layer (PO1), comprising a first composition containing polyolefin, and an extruded primer layer (PRIM1) comprising a second composition containing a thermoplastic polymer covalently bonded to functional vinyl groups: wherein the first coating layer (POI) is situated between the cellulosic support layer (PAP1) and the extruded primer layer (PRIM1).

10 Claims, 6 Drawing Sheets

(56) References Cited

U.S. PATENT DOCUMENTS

| | | |
|---|---|---|
| 2007/0004859 A1 | 1/2007 | Bacher et al. |
| 2011/0104488 A1 | 5/2011 | Muessig et al. |

OTHER PUBLICATIONS

Written Opinion for the corresponding International Application No. PCT/FI2020/050599; International Filing Date: Sep. 17, 2020; Date of Mailing: Jan. 15, 2021; 7 pages.

* cited by examiner

POLYMER-COATED CELLULOSIC RELEASE LINER BASE MATERIAL

CROSS-REFERENCE TO RELATED APPLICATIONS

This application is a National Stage application of PCT/FI2020/050599, filed Sep. 17, 2020, the content of which is incorporated by reference herein in its entirety.

TECHNICAL FIELD

The present invention relates to polymer-coated paper for release liners. The present invention further relates to methods for manufacturing a polymer-coated paper for a release liner.

BACKGROUND

A release liner is a paper or plastic/polymeric-based film sheet used to prevent a sticky surface from prematurely adhering. Typical release liners in pressure-sensitive laminates or other materials, such as tapes, are based either on cellulosic or filmic (polymeric) substrates, which are the carrier materials of the release agent. A commonly used release agent for release liners is crosslinkable silicone. These substrates are silicone coated in order to achieve desired release values for various face materials containing adhesive.

Cellulosic substrate may be coated by a thin layer of polymer, such as polyethylene (PE), polypropylene (PP), polyethylene terephthalate (PET) or similar, to achieve a smooth finish and prevent silicone resin penetration into the substrate.

Well performing silicone network must be able to smoothly release any coated adhesive layer but it must also adhere well onto the carrier substrate. This anchorage is typically achieved with weak interactions, such as hydrogen bonding. In order to achieve any level of hydrogen bonding, substrate material must have some polar groups on its surface. Polyolefin-coated cellulosic substrates, usually containing no such polar groups on their surface, are most commonly corona-treated, in order to modify their surface energy to improve silicone anchorage. Corona treatment is a process by which an electrical discharge is used to raise the critical surface tension of polymer coating to improve the adhesion of other coatings, adhesives, ink, etc. to the polymer-coated cellulosic substrate.

However, extremely high corona treatment of a polymer coating can cause polymer chain scission or pinholes on the film surface, which can cause silicone anchorage problems. Further, the anchorage that is purely based on weak interactions tends to be rather unstable over longer period of time, causing issues with silicone transfer and loss of specific release properties.

SUMMARY

The present application represents a new approach to provide polymer-coated cellulosic substrates for release liners with improved properties and to simplify the steps as well as the chemicals involved in the manufacturing process thereof.

In one aspect, the present application provides a polymer-coated cellulosic substrate for a release liner, comprising

2 a cellulosic support layer, a first coating layer, comprising a first composition containing polyolefin, an extruded primer layer comprising a second composition containing a thermoplastic polymer covalently bonded to functional vinyl groups; thus, the extruded primer layer comprises the functional vinyl groups;

wherein the first coating layer is situated between the cellulosic support layer and the extruded primer layer.

Preferably, said thermoplastic polymer covalently bounded to functional vinyl groups has been obtained from a reaction product of a molten thermoplastic and a grafting agent containing functional vinyl groups. This is beneficial because the reaction product is a solid substance that does not require any processing before further melt processing. Moreover, the modification can also be done online in the film extruder.

Optionally, the polymer-coated cellulosic substrate may further comprise a tie layer, which is situated between the first coating layer and the extruded primer layer.

The polymer-coated cellulosic substrate according to the present application has several effects, as to be explained below.

The extruded primer layer, on one hand, has excellent adherence to the underlying first coating layer, as the thermoplastic melt sticks firmly to the first coating layer after solidifying, when using adjacent polymer compositions, i.e. the first composition and the second composition, with similar polarity or covalent bonds at their interface.

One the other hand, the extruded primer layer which comprises functional vinyl groups as the extruded primer layer comprises the second composition of a thermoplastic polymer covalently bonded to functional vinyl groups, provides an excellent foundation for siliconization, as the functional vinyl groups in the structure of the thermoplastic polymer, which are present in the extruded primer layer, are able to form covalent bonds with an addition curing silicone, when forming a release liner of the polymer-coated cellulosic substrate that contains the extruded primer layer. Therefore, the silicone anchorage is significant improved.

The extruded primer layer according to the present application contributes an improved coverage of surface for subsequent silicone coating, which in turns improves the consistency of the release value. A high quality silicone coating requires good coverage of the substrate.

Further, a problem associated especially with polyolefin-coated cellulosic substrates is the existence of pinholes. Pinholes are one of the coating defects. Pinholes are pore-like penetrations present on a coating. In the manufacturing process of polyolefin-coated cellulosic substrate, the polymer can be extrusion-coated or laminated onto a cellulosic substrate to prepare an initially pinhole-free coating or laminate, but very often, when the coated or laminated substrate is subsequently subjected to a substantial thermal treatment, the polymeric coating is re-melted while the volatile substances entrained in the cellulosic substrate volatilize, and pinholes often form in the coating and remain after the substrate is permitted to cool and the polymeric coating material re-solidifies. Also, when a polyolefin-coated cellulosic substrate is subject to corona treatment, pinholes may form on the polyolefin coating.

Pinholes on the substrate surface may lead to uncoated areas of silicone coating, which will increase the release value and give poor release stability over time. There is also a risk the silicone would penetrate and contaminate the underlying cellulosic substrate through the pinholes.

Pinholes in the polyolefin coating may lead to areas of silicone coating with poor anchorage and silicone rub-off, resulting in poor release stability over time. The polymer-coated cellulosic substrate according to the present application is pinhole-free. The extruded primer layer does not contain water or solvent, and thus entrapping moisture or volatile solvent is avoided. Further, as there are less holes to be filled with the silicone coating, the polymer-coated cellulosic substrate according to the present application can be siliconized with a less silicone coat weight, as compared with the polyolefin-coated such as PE-coated cellulosic substrate without the extruded primer layer. Thus, cost-efficiency of preparing silicone coating can be improved. Furthermore, the risk of silicone penetrating and contaminating the cellulosic support substrate through the pinholes, is also highly decreased.

The present application provides a method for manufacturing a polymer-coated cellulosic substrate for release liner, said method comprising, providing a cellulosic support layer,
  extruding a molten first composition containing polyolefin, thereby obtaining an extruded first composition,
  extruding a molten second composition comprising a thermoplastic polymer covalently bonded to functional vinyl groups, thereby obtaining an extruded second composition; thus, the extruded primer layer comprises the functional vinyl groups,
  allowing the temperature of the extruded molten first composition to decrease below its melting point thereby forming a first coating layer,
  allowing the temperature of the extruded molten second composition to decrease below its melting point thereby forming an extruded primer layer, and
  forming the polymer-coated cellulosic substrate comprising the cellulosic support layer, extruded primer layer, and the first coating layer situated between the cellulosic support layer and the extruded primer layer.
  Preferably, the method may further comprise
  extruding a third composition comprising a compatibilizer, thereby obtaining an extruded third composition, and
  allowing the temperature of the extruded molten third composition to decrease below its melting point, thereby forming a tie layer, such that the tie layer is situated between the first coating layer and the extruded primer layer.

According to the methods of the present application, at least two of the above-mentioned molten compositions may be co-extruded. For example, the first composition and the second composition may be co-extruded coating on the cellulosic support layer. In another example, the first composition, the second composition and the third composition may be co-extruded coating on the cellulosic support layer. In still another example, the second composition and the third composition may be co-extruded coating on a polyolefin-coated cellulosic support layer, which has been coated with the first composition.

In the method according to the present application, extruding a molten second composition comprising at least one thermoplastic polymer covalently bounded functional vinyl groups has several effects, as to be explained below.

The step of extruding the molten second composition may be a subsequent step following the formation of polyolefin coating on the cellulosic substrate, either before or after the polyolefin coating has been solidified; or

combined with the step of extruding the molten first composition comprising polyolefin-based material by means of co-extruding both the first and the second compositions.

Corona treatment forms hydroxyl, carboxyl, and free radical groups. As these reactive moieties react further quickly and in an uncontrollable manner, in-line corona treatment is recommended even on high level pre-treated substrates. Therefore, the corona-treated films shall be subject to silicone coating as soon as possible. Filamentary corona discharges can also create pinholes in the polymer coating layer, making the surface less suitable for siliconization.

In the method according to the present application, on the contrary, extruding a molten second composition comprising at least one thermoplastic polymer containing functional vinyl groups contributes the polymer-coated cellulosic substrate a stable surface for subsequent silicone coating. The surface of the extruded primer layer is chemically stable until the silicone coating is applied on top of it and reacting with it, and after curing a stable release liner is formed. This provides a great flexibility in the arrangement of production line in the industry.

According to the present method, during the manufacturing of the polymer-coated cellulosic substrate, volatile organic compounds are reduced or eliminated, and the drying or curing step is eliminated. The harmful chemicals are reduced, and the manufacturing steps are a lot simplified. Further, the polymer-coated cellulosic substrate according to the present application has a predictable thickness, as the extruded primer layer does not lose thickness during solidifying, while solvent-based primer layer composition may lose up to 50-70% of layer thickness during drying. Therefore, the guaranteed properties and quality of the polymer-coated cellulosic substrates produced in the industrial scale may be better managed.

The main embodiments are characterized in the independent claims. Various embodiments are disclosed in the dependent claims. The embodiments and examples recited in the claims and in the specification are mutually freely combinable unless otherwise explicitly stated.

BRIEF DESCRIPTION OF THE DRAWINGS

FIG. 5 illustrates, by way of examples, a general formula and some variations of an organic acid anhydride having at least one acyl group which has a catenated carbon structure of at least 4 carbon atoms and which ends into a vinyl group, which are suitable for use as a reagent in a method for manufacturing thermoplastic poly(vinyl alcohol) derivative by a melt state reaction;

FIG. 6 illustrates, by way of an example, an ester bond forming condensation reaction between an organic acid anhydride and thermoplastic poly(vinyl alcohol) in a melt state, wherein at least some of the organic acid anhydride reacts with the hydroxyl groups of the thermoplastic poly (vinyl alcohol) in an ester bond forming condensation reaction, such that reaction product is formed which contains carboxylic acid residue and thermoplastic poly(vinyl alcohol) derivative, wherein at least some of said carboxylic acid residue contains chains which end into vinyl groups, and at least some of the ester bonded pendant chains end into vinyl groups;

FIG. 8 illustrates, by way of an example, an ester bond forming condensation reaction between acetylundecenoyl anhydride, which is an asymmetrical anhydride comprising one acyl group derivable from 10-undecenoic acid having a vinyl group at the end; the other acyl group being derivable from acetic acid, and thermoplastic poly(vinyl alcohol) in a melt state, wherein at least some of the acetylundecenoyl anhydride reacts with the hydroxyl groups of the thermoplastic poly(vinyl alcohol) in an ester bond forming condensation reaction, such that reaction product is formed which contains acetic acid residue, 10-undecenoic acid residue and thermoplastic poly(vinyl alcohol) derivative, wherein at least some of the ester bonded pendant chains end into vinyl groups.

Figure 1A:
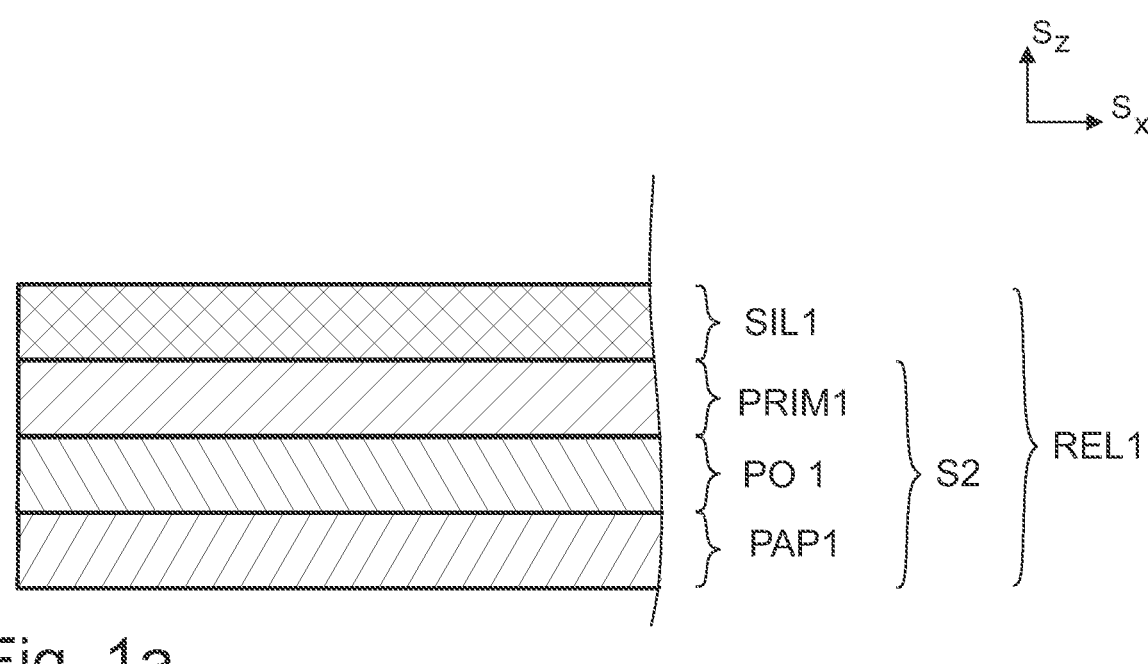
FIG. 1a shows a schematic drawing, by way of an example, of a cross-dimensional view of a release liner REL1 according to the present application comprising a polymer-coated cellulosic substrate S2 and a release layer, i.e. a silicone coating layer SIL1.

It should be noted that the drawings are not to scale.

Reference Signs

REL1—release liner
S2—polymer-coated cellulosic substrate
SIL1—silicon coating
PRIM1—extruded primer layer
TIE1—tie layer
PO1—first coating
PAPA1—cellulosic support layer
AH1—grafting agent, general
AH2—grafting agent, general
AH3—grafting agent, example
AH4—grafting agent, example
AH5—grafting agent, example
PVA1—thermoplastic PVA
CMP1—thermoplastic polymer covalently bounded to functional vinyl groups, example
CMP2—thermoplastic polymer covalently bounded to functional vinyl groups, example
CMP3—thermoplastic polymer covalently bounded to functional vinyl groups, example
RD1—carboxylic acid residue, example
RD2—carboxylic acid residue, example RD3—carboxylic acid residue, example
$R^1$—organic group
$R^2$—organic group

DETAILED DESCRIPTION

The present application provides a polymer-coated cellulosic substrate for a release liner and a method for preparing a polymer-coated cellulosic substrate for a release liner.
Definition of Polymer-Coated Cellulosic Substrate A polymer-coated cellulosic substrate, as described herein, refers to one of the three main categories of carrier substrates for industrially manufactured release liners: paper and paperboard, polymeric films, and cellulosic materials coated with polymeric layers.

Polymeric coatings may be applied on one or both sides of the cellulosic materials to make them, for example, smooth and moisture resistant. Commonly used materials for polymeric coatings include polyolefins, for example low-density polyethylene (LDPE), high-density polyethylene (HDPE), linear low-density polyethylene (LLDPE), polypropylene (PP), and the like, and the blends thereof. For example, the polymeric coatings may contain a blend of HDPE and LDPE.

The coat weight of polymeric materials for coating may vary according to the applications, for example in a range of 5-32 $g/m^2$. In some examples, when the cellulosic substrate is to be coated only on one side, the coat weight may be 10-15 $g/m^2$ of polyolefin (s). In some examples, while the cellulosic substrate is to be coated on both sides, each coating may have a coat weight in a range of 18-20 $g/m^2$ of polyolefin (s). When having a target density of 1 $g/cm^3$, 1 $g/cm^2$ polymeric materials correspond to 1 μm thickness. The thickness of a polymer-coated cellulosic substrate varies according to the basis weight/grammage desired and other end-use considerations. The desired grammage of the polymer-coated cellulosic substrate may be achieved by a laminating machine, which is known by a person skilled in the art.
Definition of Cellulosic Support Layer A cellulosic support layer refers to a wide range of substrates, which mainly comprise cellulosic materials, suitable for being used as carrier material of the release agent after being coated on one or both sides. The purpose of a cellulosic support layer is to provide dimensionally stable and dense surface, on which a coating may be applied.

The cellulosic support layer may be a paper, preferably an industrial paper, for example natural, bleached, or semi-bleached kraft paper, calendered or supercalendered kraft (SCK) paper, parchment, glassine paper, machine-finished paper, machine-glazed paper, fine paper, or paperboard having basis weights of 18-400 $g/m^2$ (ISO 536) and thicknesses of 30-500 micrometers.
Definition of Extruded Primer Layer The term "extruded primer layer", as described herein, refers to a layer structure that has been made of thermoplastic substance by extrusion. Extrusion is a manufacturing process known by a person skilled in the art. In the extrusion process of manufacturing a layer structure of extruded primer layer, raw material is melted by the mechanical energy generated by turning screws and by heaters arranged along the barrel of the extruder, and the molten material is then forced into a die, which shapes the molten material into a shape in a continuous profile that solidifies during cooling, thereby forming into of an extruded primer layer. There are a variety of dies used in the extrusion in order to form a layer structure, such dies including, but not limited to those used in blown film extrusion, sheet/film extrusion, coextrusion and extrusion coating, all of which are known by a person skilled in the art. Naturally, the extruded primer layer may be realized by means of blown film extrusion, extrusion coating, co-extrusion, lamination, film-transfer coating and the like. The extruded primer layer has different properties from the solvent-based primer layer, as will be explained further in the present description.

Figure 1B:
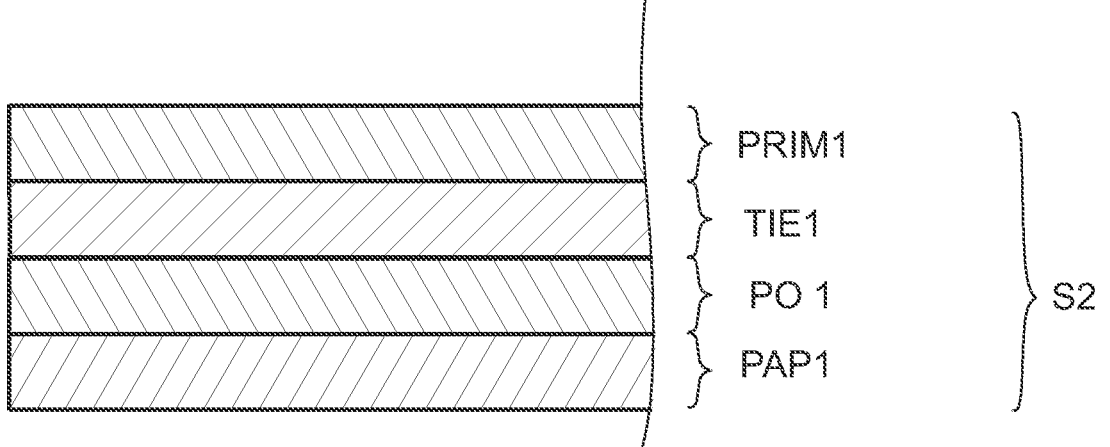
FIG. 1b shows a schematic drawing, of a cross-dimensional view of an example of a polymer-coated cellulosic substrate S2 for a release liner according to the present application.
Figure 4:
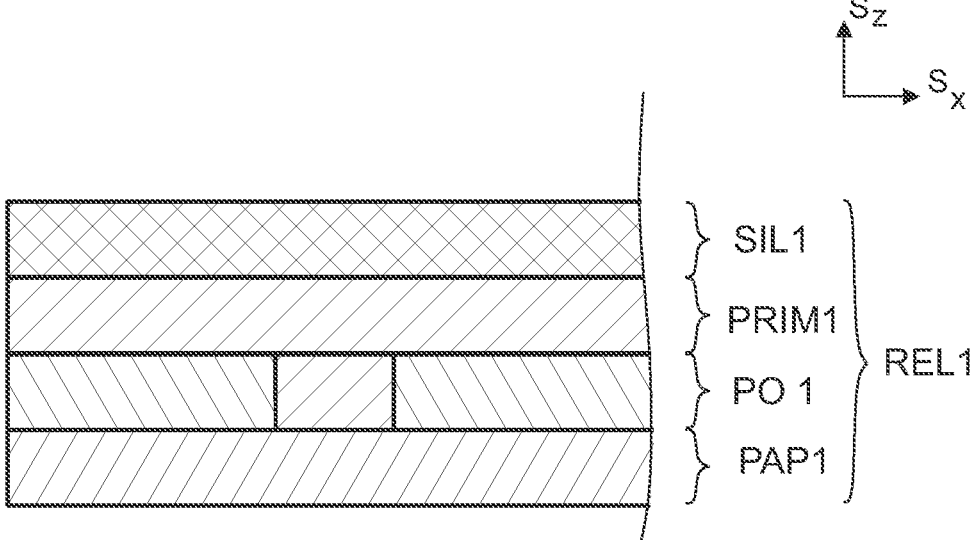
FIG. 4 shows an example of a release liner according to the present application.

Description of Polymer-Coated Cellulosic Substrates According to the Application Reference may be made to FIG. 1 and FIG. 4. It is noted that the examples shown in FIG. 1 and FIG. 4 do not bound to any specific embodiments, but merely serve the purpose for explaining the relative location of features denoted with reference signs. Also, FIG. 1 and FIG. 4 show the schematic drawings of examples, not scaled drawings.

The present application provides a polymer-coated cellulosic substrate S2 for a release liner REL1, comprising
a cellulosic support layer PAP1,
a first coating layer PO1, comprising a first composition containing polyolefin,
an extruded primer layer PRIM1 comprising a second composition containing a thermoplastic polymer covalently bonded to functional vinyl groups;
wherein the first coating layer PO1 is situated between the cellulosic support layer PAP1 and the extruded primer layer PRIM1.

The term "thermoplastic polymer covalently bounded to functional vinyl groups", as described herein, refers to a thermoplastic polymer wherein the backbone of the polymer has at least one type of functional pendant groups comprising a vinyl group having the formula-CH=CH2. Such functional groups include, for example, vinyl, allyl, acrylic, 4-pentenylic and 10-undecenylic groups. To be extrudable, a material has to be thermoplastic, i.e. a polymer material that becomes pliable or moldable at a certain elevated temperature and solidifies upon cooling.

Further to any of the polymer-coated cellulosic substrates as presented herein according to the present application, the thermoplastic polymer covalently bonded to functional vinyl groups may have preferably been obtained from the reaction product of a molten thermoplastic and a grafting agent containing functional vinyl groups, for example by means of reactive extrusion. The reaction is fast and cost efficient. More preferably, the reaction is a solvent-free reaction. As the reaction does not require any organic solvent or water, obtaining the resulting reaction product does not require any solvent separation or drying, either. The reaction product, which is also in a melt form, may be extruded, either simply for direct coating, or to be cooled down and granulated for easy transportation and storage for later use. Thus, when the thermoplastic polymer has been obtained from the reaction product of a molten thermoplastic and a grafting agent containing functional vinyl groups, the application thereof is more versatile.

Figure 5:
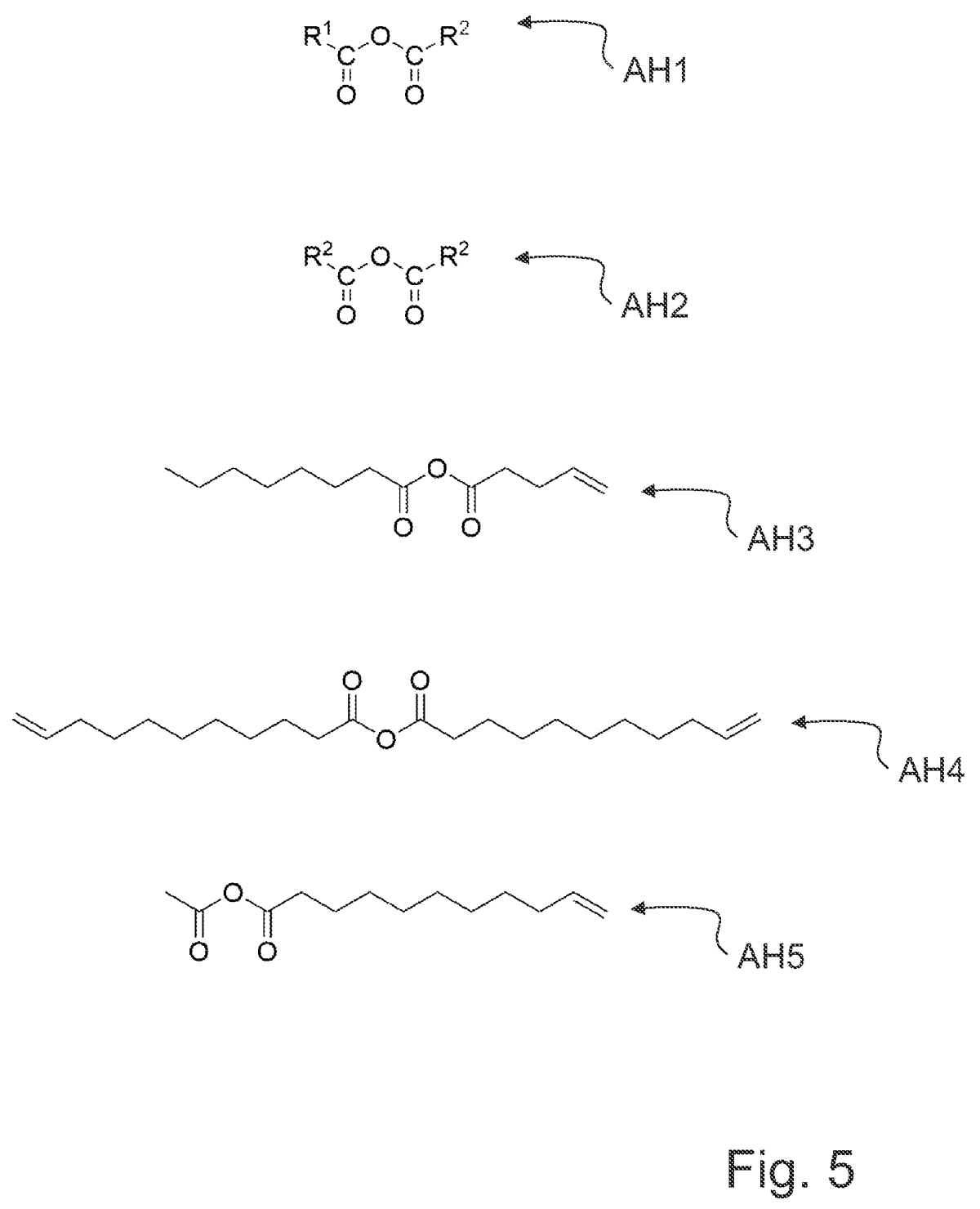

Examples of grafting agents may be organic acid anhydrides, which may be represented by chemical formulas denoted as AH1, AH2, AH3, AH4 and AH5 in FIG. 5, wherein $R^1$ and $R^2$ represent different organic groups.

An organic acid anhydride refers to an organic compound that has two acyl groups bonded to the same oxygen atom. The organic acid anhydride may be aliphatic and a symmetrical anhydride or an asymmetrical anhydride. A symmetrical anhydride, as used herein, refers to an anhydride which has two identical acyl groups, each acyl group ending into a vinyl group. An asymmetrical anhydride, as used herein, refers to an anhydride which has non-identical acyl groups, of which at least one acyl group ends into a vinyl group Further to any of the polymer-coated cellulosic substrates as presented herein according to the present application, the thermoplastic polymer containing vinyl groups has been formed from a thermoplastic poly(vinyl alcohol) (PVA) having a degree of hydrolysis in the range of 65 to 95 mol-%, such as 65, 70, 75, 80, 85, 90, or 95 mol-%.Degree of hydrolysis below 95% is needed to keep melting point of PVA below 200° C., to avoid thermal degradation. PVA is a stable and non-toxic synthetic polymer, which has excellent film forming, emulsifying and adhesive properties. It is manufactured by hydrolysis of poly(vinyl acetate), which is a soft and sticky polymer at ambient temperature. The degree of hydrolysis should be at least 65% to ensure that the extruded PVA, containing vinyl groups, forms a solid non-sticky film that can be wound into a reel. Thus, the expression "thermoplastic poly(vinyl alcohol)" in this context refers to poly(vinyl alcohol) possessing thermoplasticity. A degree of hydrolysis in the range of 65 to 95 mol-% also contributes to the improved thermoplasticity of poly(vinyl alcohol). The decomposition of thermoplastic PVA during the extrusion should be avoided, as when the polymer would break down to produce water and free vinyl groups, the former in turn leads to bursting at the die and causing holes in the extruded primer layer and/or an uneven surface of the extruded primer layer, while the latter would start cross-linking reaction which in turn cause decreased functional vinyl groups in the extruded primer layer. The risk of poly(vinyl alcohol) decomposition in the elevated temperature in an extruder may be reduced by selecting a thermoplastic poly(vinyl alcohol) grade, wherein the degree of hydrolysis is sufficiently high, such as equal to or higher than 65 mol-%. However, grades that have a degree of hydrolysis equal to or higher than 95 mol-%, may be less preferable as the colouring of poly(vinyl alcohol) may also occur as a result of excessive heating, in particular when the amount of hydroxyl groups in the poly(vinyl alcohol) is very high.

Further to any of the polymer-coated cellulosic substrates as presented herein according to the present application, the thermoplastic, preferably thermoplastic PVA, derivative comprises ester bonded pendant chains of which at least some end into vinyl groups, wherein the pendant chains which end into vinyl groups contain a catenated carbon structure of at least 4 carbon atoms, preferably at least 9, most preferably from 10 to 18 carbon atoms. A catenated carbon structure having a chain length of less than 4 carbon atoms is less preferable, as the short chain length may result in the vinyl group being less accessible for reactions with silicone. A longer chain length than 18 carbon atoms is not desirable either, as it may cause the chain to fold on itself, thus also making the vinyl group less accessible.

Figure 6:
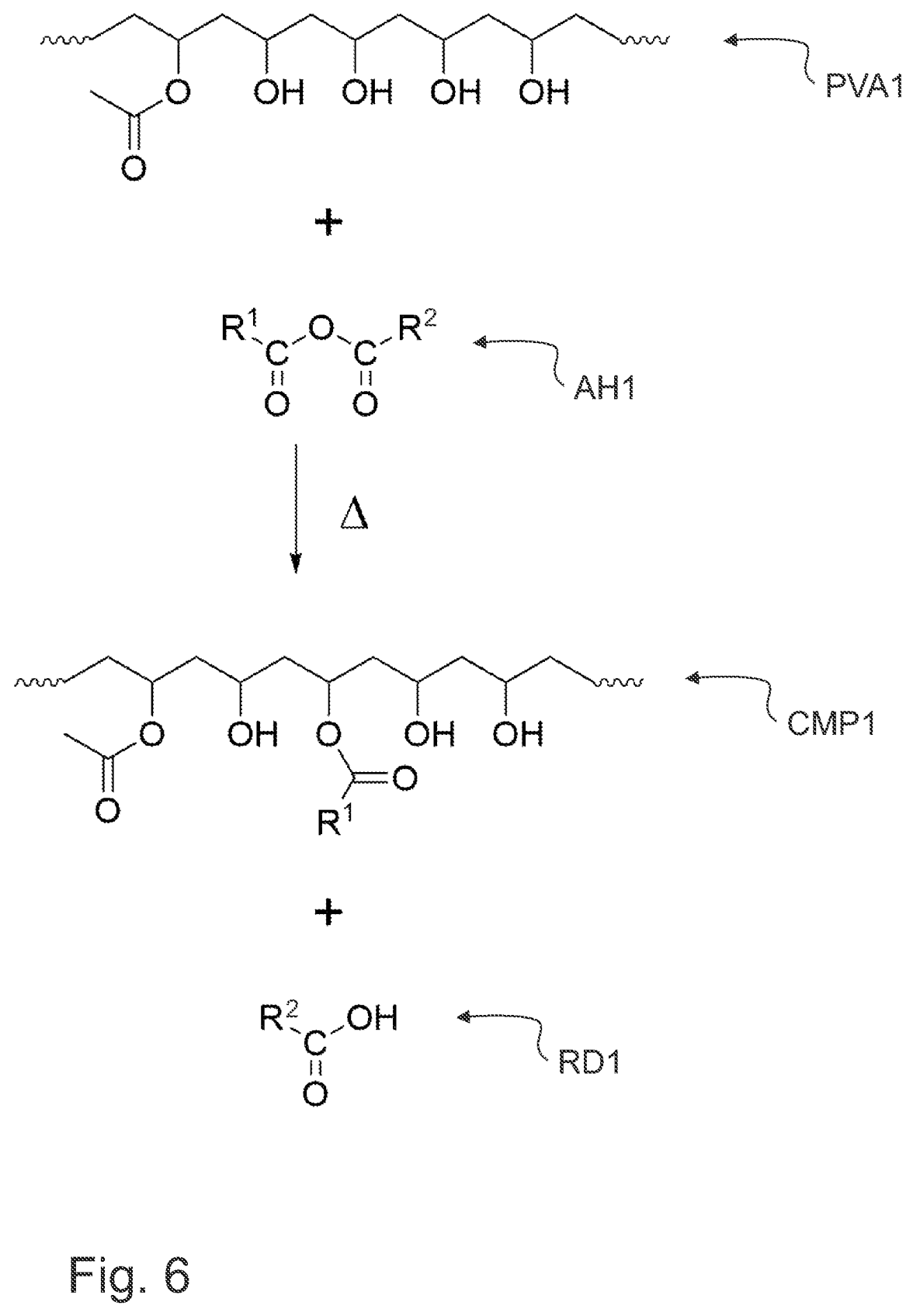
Figure 7:
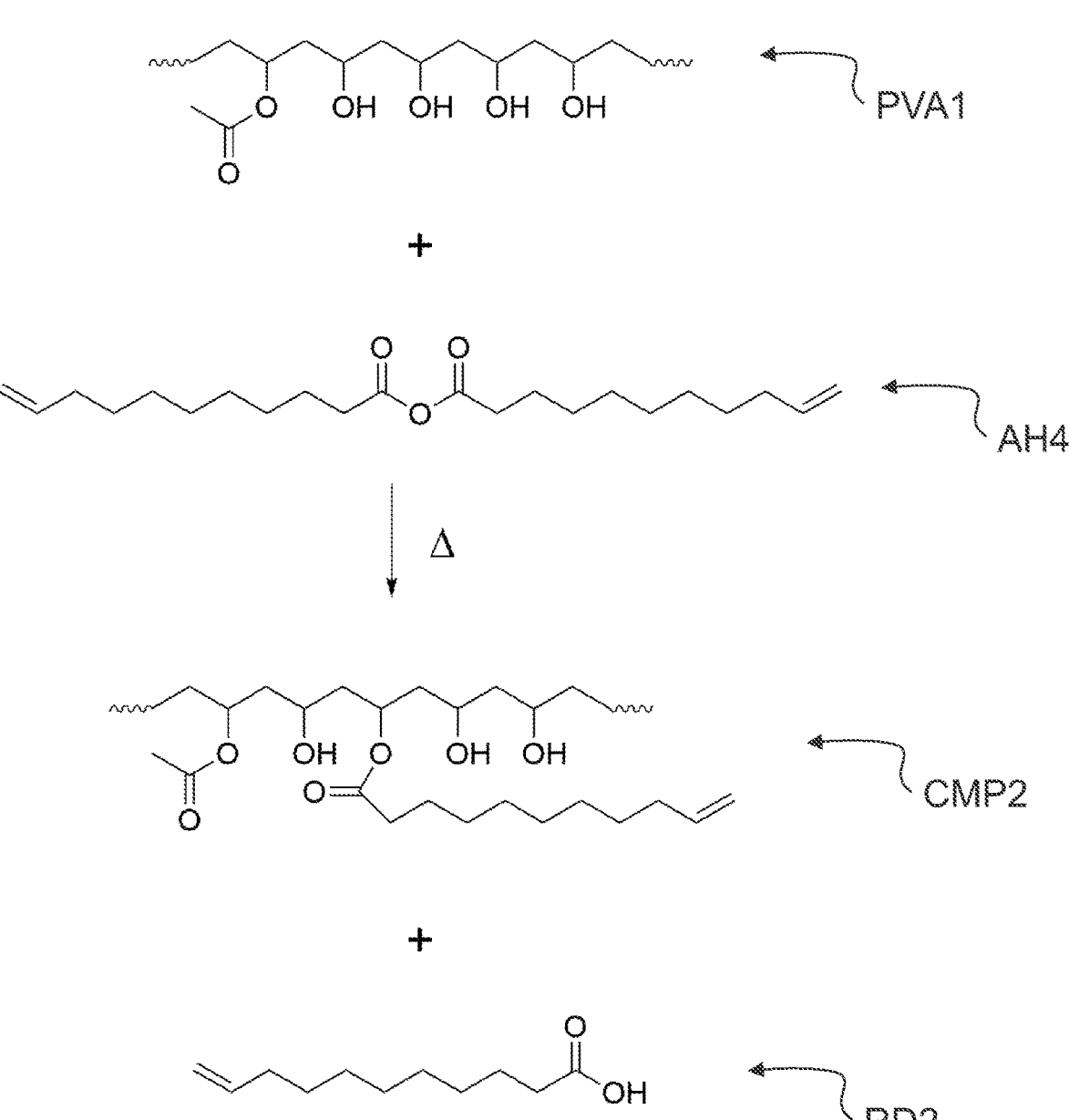
FIG. 7 illustrates, by way of an example, an ester bond forming condensation reaction between undecenoyl anhydride, which is a symmetrical anhydride comprising two identical acyl groups derivable from 10-undecenoic acid, each acyl group having a vinyl group at the end, and thermoplastic poly(vinyl alcohol) in a melt state, wherein at least some of the undecenoyl anhydride reacts with the hydroxyl groups of the thermoplastic poly(vinyl alcohol) in an ester bond forming condensation reaction, such that reaction product is formed which contains 10-undecenoic acid residue and thermoplastic poly(vinyl alcohol) derivative, wherein at least some of the ester bonded pendant chains end into vinyl groups.
Figure 8:
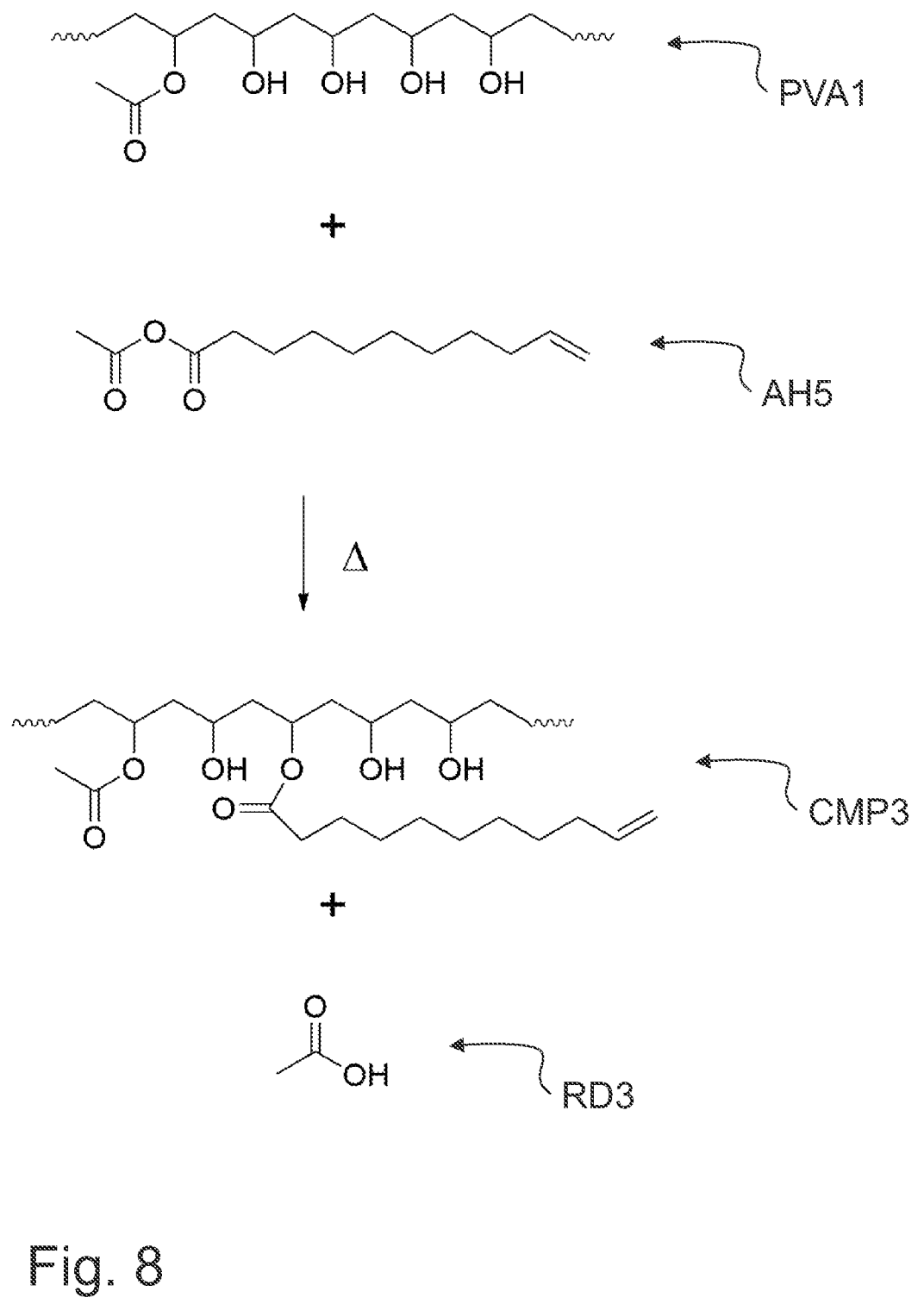

Examples of thermoplastic PVA covalently bounded to functional vinyl groups may be represented by chemical formulas denoted as CMP1 in FIG. 6, CMP2 in FIG. 7 and CMP3 in FIG. 8.

Preferably, an organic acid anhydride that participates into an ester bond forming condensation reaction should have an acyl group which has a catenated carbon structure having a carbon chain length of at least 4 carbon atoms that ends into a vinyl group. This acyl group may thereby form an ester bond with a hydroxyl group of a thermoplastic poly(vinyl alcohol) in a condensation reaction. A catenated carbon structure having a chain length of less than 4 carbon atoms in the organic acid anhydride hydrocarbon chain is not suitable, as the short chain length may lead to interference with the thermoplastic polyvinyl alcohol during the ester bond forming condensation reaction. Preferably, the catenated carbon structure contains 5 or more, preferably at least 9, most preferably from 10 to 18 carbon atoms. A longer chain length is not desirable, as it may lead to chain folding problems during or after the ester bond forming condensation reaction.

As shown in FIG. 5, in an asymmetrical anhydride AH1; AH3; AH5, the two acyl groups of the anhydride are different. In a symmetrical anhydride AH2; AH4, the two acyl groups of the anhydride are identical. The symbols $R^1$ and $R^2$, each alone, represents a functional group, of which at least one or both may have a catenated carbon structure having a carbon chain length of at least 3 carbon atoms that ends into a vinyl group.

Further to any of the polymer-coated cellulosic substrates as presented herein according to the present application, the thermoplastic, preferably thermoplastic PVA, derivative comprises ester bonded pendant chains of which at least some end into vinyl groups, wherein the pendant chains which end into vinyl groups contain a catenated carbon structure of at least 4 carbon atoms, and the extruded primer layer PRIM1 further comprises carboxylic acid residue, wherein the carboxylic acid residue is organic compound that contains the same kind of catenated carbon structures of at least 4 carbon atoms that end into vinyl group as the pendant chains of the thermoplastic poly(vinyl alcohol) derivative. The carboxylic acid residue has been observed to act as a surfactant on a polymer-coated cellulosic substrate S2. This effect has been observed even when some of the carboxylic acid residue on the extruded primer layer PRIM1 has been neutralized into the corresponding carboxylate, i.e. the salt of said carboxylic acid residue. The carboxylic acid residue, when arranged on an extruded primer layer PRIM1 of a polymer-coated cellulosic substrate S2, may be configured to improve the spreading of a subsequent silicone-based composition applicable as a release coating SIL1 on the polymer-coated cellulosic substrate S2.

Examples of carboxylic acid residue may be represented by chemical formulas denoted as RD1 in FIG. 6, RD2 in FIG. 7 and RD3 in FIG. 8.

The second composition may comprise also salt of the carboxylic acid residue, i.e. carboxylate.

Further to any of the polymer-coated cellulosic substrates as presented herein according to the present application, the second composition, comprising a thermoplastic polymer containing functional vinyl groups, may further comprise one or more additives, such as plasticizer, and/or one or more non-thermoplastic material, such as starch or carboxymethyl cellulose (CMC).

The use of plasticizers leads to better processability. Examples of such plasticizer are glycol, polyglycol, glycerine or the like.

Using a compatibilizer would be beneficial if the first coating layer PO1 and the extruded primer layer PRIM1 have polymers with different polarities.

In an example, the extruded primer layer PRIM1 comprises thermoplastic PVA covalently bounded to functional vinyl groups, and the first coating layer PO1 comprises polyolefin(s) like polyethylene(s) such as blends of HDPE and LDPE. Using a compatibilizer improves interfacial adhesion by making the first coating layer PO1 surface more polar and capable to form hydrogen bonds or covalent bonds with hydroxyl groups of thermoplastic PVA. Extruded primer layer PRIM1 can form improved interfacial adhesion with a sufficiently polar surface. An additional tie layer TIE 1 is a better alternative than a mixture of a nonpolar polymer and a compatibilizer, because it results in higher density of polar groups available on the surface.

Further to any of the polymer-coated cellulosic substrates as presented herein according to the present application, wherein the thermoplastic polymer covalently bounded to vinyl groups has been formed from a thermoplastic poly (vinyl alcohol), at least one of the first coating layer PO1 and the extruded primer layer PRIMA1 further comprises at least one compatibilizer, being polyolefin grafted with maleic anhydride, acrylic acid, or glycidyl methacrylate; and additionally or alternatively, the polymer-coated cellulosic substrate S2 may further comprise a tie layer TIE1, between the first coating layer PO1 and the extruded primer layer PRIM1, for example an adhesion promoted layer comprising at least one compatibilizer, such as polyolefin grafted with maleic anhydride, acrylic acid, or glycidyl methacrylate.

In some examples, the extruded primer layer PRIM1 may comprise a compatibilizer, such as anhydride modified polyolefin. The anhydride reacts with alcohols to form ester crosslinks.

In some examples, the first coating layer PO1 comprises a compatibilizer, such as anhydride modified polyolefin. The anhydride present on the surface of the first coating layer PO1 reacts with alcohols present in the extruded primer layer PRIM1 to form ester crosslinks, and thus, the adhesion between the extruded primer layer PRIM1 and the first coating layer PO1 is further improved.

Further to any of the polymer-coated cellulosic substrates as presented herein according to the present application, the cellulosic support layer PAP1 comprises cellulose fibers containing pulp, wherein the cellulose fibers preferably originate from wood. Wood species differ from each other in their mechanical properties and chemical compositions. The wood material used for the cellulosic support layer PAP1 can be from softwood trees, such as spruce, pine, fir, larch, douglas-fir or hemlock, or from hardwood trees, such as birch, aspen, poplar, alder, *eucalyptus* or acacia, or from a mixture of softwoods and hardwoods.

The pulp used in the cellulosic support layer PAP1 may comprise cellulose fibers from both hardwood and softwood. Pulp comprising a mixture of hardwood and softwood may be used to improve the internal bond strength of the paper web during manufacturing process.

Thus, in this context, cellulose pulp preferably refers to material originating from wooden material, which has been processed into fibrous form, such as fibers, using chemical, mechanical, thermomechanical, or chemithermo-mechanical pulping process(es). In accordance with an embodiment, a pulp used for making the cellulosic support layer PAP1 suitable for a release liner does not contain any kind of mechanical pulp due to high quality requirements of the release liner REL1.

The cellulosic support layer PAP1 of the release liner REL1 may also comprise other components, such as fillers. For example, at least one kind of mineral filler may be used in the support layer SUP1. Mineral filler can comprise, for example, at least one of the following: clay, calcined clay, kaolin, natural ground calcium carbonate, precipitated calcium carbonate, talc, calcium sulphate, and titanium dioxide. In addition, the cellulosic support layer PAP1 may comprise a mineral coating layer.

The total amount of the mineral filler in the cellulosic support layer PAP1 may be equal to or more than 0 wt. % for example at least 0.5 wt.-% based on the total weight of the cellulosic support layer PAP1. The total amount of the mineral filler in the cellulosic support layer PAP1 is preferably less than 10 weight-%, more preferably less than 5 weight-%, and most preferably less than 3 weight-%, for example between 0.5 and 5 wt.-%, or between 0 wt.-% and 3 wt.-%, based on the total weight of the cellulosic support layer PAP1. The mineral fillers may decrease costs of the manufactured product. However, in addition to the decreased strength properties, mineral fillers may also decrease transparency level of the product.

The cellulosic support layer PAP1 may be calendered with a calender or a supercalender before or after applying the first coating layer, to obtain a product having high density surface.

It may be good for manufacturing and transportation costs to reduce the grammage of the paper to reduce the weight of a release liner. This, however, may often result in adverse effects, since typically paper having less grammage is also thinner and may have poor strength properties. Therefore, it may not be suitable for the intended purpose, such as use as a support layer in an automated high-speed labelling process. When the grammage is reduced, the specific volume and tearing resistance of a conventional paper are typically also reduced. The smoothness of the paper surface may thus decrease, which may have a negative effect on the subsequent release coating.

The cellulosic support layer PAP1 suitable for a release liner REL1 preferably have a grammage equal to or less than 160 g/m$^2$, preferably equal to or less than 80 g/m$^2$, and most preferably equal to or less than 70 g/m$^2$. The cellulosic support layer PAP1 suitable for a release liner preferably has a grammage equal to or higher than 30 g/m$^2$, such as equal to or higher than 40 g/m$^2$, for example in the range of 30 g/m$^2$ to 120 g/m$^2$, or in the range of 40 g/m$^2$ to 100 g/m$^2$. The cellulosic support layer PAP1 having a grammage in the range of 40 to 80 g/m$^2$, most preferably in the range of 50 to 70 g/m$^2$, may benefit of the increase in bulk. Grammage in this context refer to the basis weight, given in grams per square meter (g/m$^2$).

Therefore, grammage of the cellulosic support layer PAP1 is preferably at least 35 g/m$^2$ and more preferably at least 40 g/m$^2$, and preferably less than 100 g/m$^2$, more preferably equal to or less than 90 g/m$^2$. Grammage may be, for example, in the range of 38 to 100 g/m$^2$ or between 40 and 90 g/m$^2$.

Thus, further to any of the polymer-coated cellulosic substrates as presented herein according to the present application, the cellulosic support layer PAP1 comprises fibres of Kraft pulp, and the grammage of the cellulosic support layer is from 35 g/m$^2$ to 100 g/m$^2$.

The extruded primer layer PRIM1 has excellent adherence to the overlying silicone coating SIL1. On the polymer-coated cellulosic substrate S2 according to the present application, a silicone resin coating SIL1 may be applied, i.e. a release coating, which is subsequently thermally cured in a catalytic hydrosilation reaction, on a surface of the extruded primer layer PRIM1 of the polymer-coated cellulosic substrate S2, thereby a release linear REL1 comprising a silicone resin coating SIL1, a cellulosic support layer PAP1, a first coating layer PO1 on the cellulosic support layer PAP1, and an extruded primer layer PRIM1 situated between the silicone resin coating SIL1 and the first coating layer PO1, is formed.

The catalytic hydrosilation reaction, also denoted as hydrosilylation, refers to a covalent bond formation between functional vinyl groups in the silicone base polymer and silane hydride (Si—H) groups in the cross-linker compound in the presence of a platinum catalyst. This reaction results into a solid release layer SIL1, on the surface of the extruded primer layer PRIM1. Due to the functional vinyl groups present on the surface of the extruded primer layer PRIM1, during the catalytic hydrosilation reaction, a covalent bond also forms between functional vinyl groups in the extruded primer layer PRIM1 and silane hydride (Si—H) groups in the cross-linker. The covalent bonds between the silicone coating SIL1 and the extruded primer layer PRIM1 contribute a strong interaction and therefore promote the anchorage of the silicone coating SIL1 to the polymer-coated cellulosic substrate S2.

Figure 2:
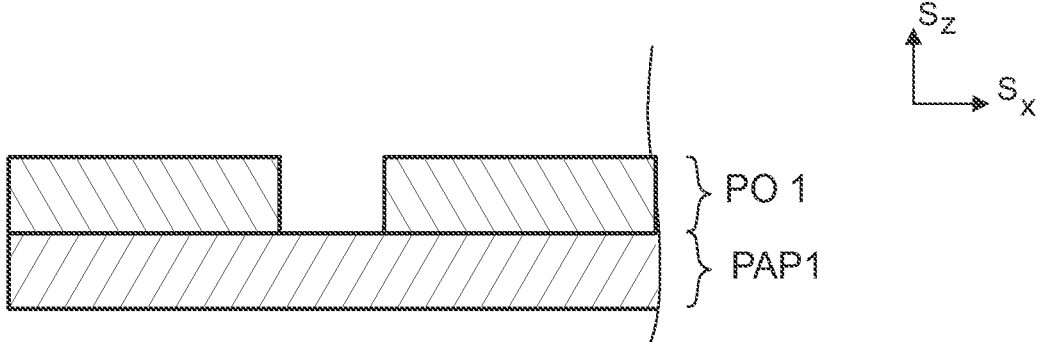
FIG. 2 shows a polyolefin-coated cellulosic substrate without an extruded primer layer.
Figure 3:
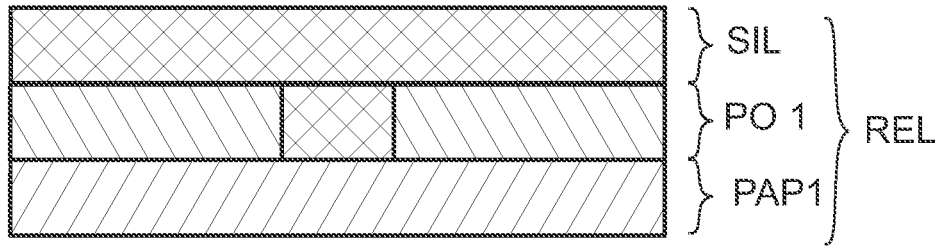
FIG. 3 shows a release liner, comprising a polyolefin-coated cellulosic substrate without an extruded primer layer.

Furthermore, the extruded primer layer PRIM1 contributes an improved coverage of surface for the subsequent silicone coating, which in turns improves the consistency of the release value. Release value is used to denote the minimum amount of force required to detach a label or excess matrix material from the release liner. A high-quality silicone coating SIL1 requires good coverage of the polymer-coated cellulosic substrate S2. Reference may be made to FIG. 2 and FIG. 3. Uncoated areas, pinholes, as illustrated in FIG. 2, and contaminations will increase the release value and give poor release stability over time. The surface of the polymer-coated cellulosic substrate S2 with less defects, such as pinholes, also promotes the good coverage of the silicone coating. Pinhole is a pore-like penetration which is usually present in solvent-based coatings due to the entrapment of moisture, air, solvents or other fluids. The number of pinholes on the surface of the extruded primer layer PRIM1 according to the present application has been significantly decreased. This is because the primer layer composition for the extruded primer layer PRIM1 does not contain water or solvent, and thus entrapping moisture or volatile solvent is avoided. Further, there is no need for corona treatment, which may also cause pinholes on the polyolefin coating. As there are less holes to be filled with the silicone coating, the polymer-coated cellulosic substrate S2 according to the present application can be siliconized with a lower silicone coat weight. The cellulosic support layer PAP1 is also protected from being contaminated by the silicone. Thus, cost-efficiency of preparing silicone coating can be improved.

Further to any of the polymer-coated cellulosic substrates as presented herein according to the present application, the polymer-coated cellulosic substrate has at least one of the following properties:
the PPS roughness value is less than 2 μm,
the extruded primer layer PRIM1 comprising thermoplastic polymer covalently bound to functional vinyl groups has a coat weight of at least 0.6 g/m$^2$,
the extruded primer layer PRIM1 contains functional vinyl groups in an amount of at least 0.06 mmol/m$^2$,
the thermoplastic polymer contains a vinyl group molality $b_{vin}$ which is in the range of 0.05 mmol/g to 2.00 mmol/g, preferably in the range of 0.10 mmol/g to 1.10 mmol/g, and most preferably in the range of 0.15 mmol/g to 0.80 mmol/g, determined as millimoles per gram of dry thermoplastic polymer, when determined by iodometric titration method following the standard ISO 396 1:2009(E).

The polyolefin-coated such as PE-coated paper usually has a Parker Print-Surf (PPS) mean roughness value of 1-2 μm. The measurement of PPS roughness may be obtained by using a Parker Print Surface roughness tester, which is known by a person skilled in the art. The polymer-coated cellulosic substrate according to the present application having a PPS roughness value of less than 2 μm contributes a smooth surface for the subsequent silicone coating. Further, as mentioned above, the polyolefin-coated such as PE-coated paper may contain pinholes. Such hole is illustrated in FIG. 2. Thus, when the silicone coating solution is applied, as shown in FIG. 3, the coating solution fills the hole, leading to a waste of expensive coating solution and a risk of contaminating the cellulosic support layer.

According to the present application, if the first coating layer PO1 comprises any small holes, these may be filled with the extruded primer layer PRIM1, as illustrated in FIG. 4. Thus, the polymer-coated cellulosic substrate S2 may have an improved smoothness. Thus, the polymer-coated cellulosic substrate according to the present application is pinhole-free. This contributes a smooth surface for the subsequent silicone coating. Less silicone coating solution is needed for a smoother surface. According to the present application, the extruded primer layer contributes a smooth surface for subsequent silicone coating. The polymer-coated cellulosic substrate according to the application can be siliconized with a less silicone coat weight, for example of 0.6 to 0.8 g/m², or even less. Therefore, it is a desirable solution economically. Furthermore, the extruded primer layer has a consistent surface roughness which contributes consistent release values of the silicone coating.

The polymer-coated cellulosic substrate according to the present application is pinhole free. This contributes a good coverage for the subsequent silicone coating. This ensures the good release value of the release layer.

According to the present application, the disclosed amounts of the thermoplastic polymer covalently bounded to functional vinyl groups are proven to contribute a good silicone anchorage. The coat weight may be, for example, 0.5-10.0 g/m², preferably 0.5-4.0 g/m², more preferably 1.0-2.0 g/m². The experimental result has supported that the extruded primer layer PRIM1, containing the thermoplastic polymer, such as thermoplastic PVA covalently bounded to functional vinyl groups, in an amount 0.6 g/m², contributes excellent adherence between the polymer-coated cellulosic substrate and the silicone layer in a rub-off test.

The same effect has been observed that the disclosed amounts of vinyl groups are proven to contribute a good silicone anchorage. The functional vinyl groups contained in the extruded primer layer PRIM1, which comprises for example thermoplastic PVA covalently bounded functional vinyl groups, may be at a vinyl group density in a range of, for example, 0.025-20 mmol/m², preferably 0.05-4.0 mmol/m², and more preferably 0.15-1.6 mmol/m².

The same effect has been observed, when the thermoplastic polymer contains a vinyl group molality $b_{vin}$ which is in the range of 0.05 mmol/g to 2.00 mmol/g, preferably in the range of 0.10 mmol/g to 1.10 mmol/g, and most preferably in the range of 0.15 mmol/g to 0.80 mmol/g, determined as millimoles per gram of dry thermoplastic polymer, such as thermoplastic PVA containing functional vinyl groups, when determined by iodometric titration method following the standard ISO 3961:2009(E). Therefore, it is a desirable solution economically. Thus, it is possible to obtain a product having good rub-off properties. Further, the amount of a release coating containing silicone compound may be reduced. Still further, less amount of release coating also requires less platinum catalyst for curing to take place. Because siliconizing a reactive surface layer may require less platinum catalyst for silicone curing to take place, the manufacturing costs of the release liner may be reduced.

Further to any of the polymer-coated cellulosic substrates as presented herein according to the present application, the first coating layer PO1 may comprise polypropylene, or polyethylene such as low density polyethylene (LDPE) and/or high density polyethylene (HDPE), as these polymers are especially suitable for release liners and inexpensive. The extruded primer layer according the present application is applicable to a wide diversity of polymeric coated papers.

In some examples, the polymer-coated cellulosic substrate may further comprise a tie layer TIE1 between the extruded primer layer PRIM1 and the first coating layer PO1. The thermoplastic polymer covalently bonded to functional vinyl groups has been formed from a thermoplastic poly(vinyl alcohol), and the first coating layer PO1 comprises a polyolefin, such as a polyethylene, and the tie layer TIE1 comprises polyethylene grafted with maleic anhydride.

Detailed Description of Methods According to the Application

The present application further provides a method for manufacturing a polymer-coated cellulosic substrate S2 for release liner, said method comprising providing a cellulosic support layer PAP1, extruding a molten first composition containing polyolefin, thereby obtaining an extruded first composition, extruding a molten second composition comprising a thermoplastic polymer covalently bonded to functional vinyl groups, thereby obtaining an extruded second composition, allowing the temperature of the extruded molten first composition to decrease below its melting point thereby forming a first coating layer PO1, allowing the temperature of the extruded molten second composition to decrease below its melting point thereby forming an extruded primer layer PRIM1, and forming the polymer-coated cellulosic substrate S2 comprising the cellulosic support layer PAP1, extruded primer layer PRIM1, and the first coating layer PO1 situated between the cellulosic support layer PAP1 and the extruded primer layer PRIM1.

The resulting product, the polymer-coated cellulosic substrate S2, of the method according to the present application, has the effects as discussed above.

The second composition, comprising extrudable polymeric material, including the thermoplastic polymer covalently bounded to functional vinyl groups as defined above, as well as the possible additives, such as plasticizers or compatibilizers, may be fed to an extruder to form the molten second composition. This may be applicable for extrusion coating the resulting extruded primer layer PRIM1 onto the surface of the first coating layer PO1 of the cellulosic support layer PAP1, which cellulosic support layer PAP1 with a first coating layer PO1 thereon may be a carrier sheet traveling past the extruder die slot. The die extrudes the polymeric material vertically through a narrow slot to form a thin low viscosity coating of a melt of uniform thickness that uniformly coats the carrier sheet which is continuously moving at high speed past the extruder die slot. As mentioned above, due to the functional vinyl groups present on the surface of the extruded primer layer PRIM1, during the catalytic hydrosilation reaction of curing the silicone coating, a covalent bond forms between functional vinyl groups in the extruded primer layer PRIM1 and silane hydride (Si—H) groups in the cross-linker in the silicone coating composition. The surface of the extruded primer layer is reactive to the silicone coating only during the course of applying the silicone coating. This provides a great flexibility in the arrangement of production line in the industry. The thickness of the extruded primer layer PRIM 1 may be controlled by winding speed. Therefore, the guaranteed properties and quality of the polymer-coated cellulosic substrates produced in the industrial scale may be better managed. Further, extrusion coating operations use high melt temperatures to lower the melt viscosity. This improves coating thickness uniformity and adhesion.

Preferably, the method may further comprise extruding a third composition comprising a compatibilizer, thereby obtaining an extruded third composition, and allowing the temperature of the extruded molten third composition to decrease below its melting point, thereby forming a tie layer TIE1, such that the tie layer TIE1 is situated between the first coating layer PO1 and the extruded primer layer PRIM1.

According to the methods of the present application, at least two of the above-mentioned molten compositions may be co-extruded. For example, the first composition and the second composition may be co-extruded coating on the cellulosic support layer. In another example, the first composition, the second composition and the third composition may be co-extruded coating on the cellulosic support layer. In still another example, the second composition and the third composition may be co-extruded coating on a polyolefin-coated cellulosic support layer, which has been coated with the first composition.

The resulting product, the polymer-coated cellulosic substrate S2, of the method according to the present application, has the effects as discussed above.

The extrusion apparatus for implementing the co-extrusion method according to the present application may comprise, for example at least two extruders, a film nozzle, a cooling cylinder, an optional orientation/stretching unit, and a rewinder. The molten first composition and the molten second composition and optionally the third composition, feed from extruders, respectively, converge in the nozzle and become laminated together into a single film. As mentioned above, due to the functional vinyl groups present on the surface of the extruded primer layer PRIM1, during the catalytic hydrosilation reaction of curing the silicone coating, a covalent bond forms between functional vinyl groups in the extruded primer layer PRIM1 and silane hydride (Si—H) groups in the cross-linker in the silicone coating composition. The surface of the extruded primer layer is reactive to the silicone coating only during the course of applying the silicone coating. This provides a great flexibility in the arrangement of production line in the industry. Layer ratios may be controlled by the screw rotation rates, and the total film thickness may be controlled by winding speed. Therefore, the predictability and guaranteed properties and quality of the polymer-coated cellulosic substrates produced in the industrial scale may be better managed.

For implementing one of the methods as presented herein according to the present application, an extruder may be used to convert a solid composition comprising a thermoplastic polymer containing vinyl groups, into a melt at the appropriate temperature required for coating, thereby obtaining a molten second composition comprising a thermoplastic polymer containing vinyl groups. Preferably, said thermoplastic polymer has been obtained from the reaction product of a molten thermoplastic and a grafting agent containing functional vinyl groups.

The same or another extruder may be used to allow a chemical reaction for modifying a thermoplastic to result a thermoplastic polymer containing vinyl groups in the molten state at the appropriate temperature required for coating, thereby obtaining a molten second composition comprising a thermoplastic polymer containing vinyl groups. The thermoplastic polymer may be obtained from the reaction product of a molten thermoplastic and a grafting agent, for example by means of reactive extrusion.

Further to any of the methods as presented herein according to the present application, the thermoplastic polymer may have been obtained from the reaction product of a molten thermoplastic and a grafting agent containing functional vinyl groups. Such a method is fast and cost efficient. The reaction is more advantageously a solvent-free reaction. As the reaction does not require any organic solvent or water, obtaining the resulting reaction product does not require any solvent separation or drying, either. The reaction product, which is also in a melt form, may be extruded, either simply for direct coating, or to be cooled down and granulated for easy transportation and storage for later use. The reaction is easy to implement in a reactor such as an extruder, and hence does not suffer from mixing problems, which may be present in solvent-based reactions.

Further to any of the methods as presented herein according to the present application, the thermoplastic polymer containing vinyl groups has been formed from a thermoplastic poly(vinyl alcohol) (PVA) having a degree of hydrolysis in the range of 65 to 95 mol-%, such as 65, 70, 75, 80, 85, 90, or 95 mol-%. The definition of such a thermoplastic poly(vinyl alcohol) and the effects brought have been described above. The resulting product, the polymer-coated cellulosic substrate S2, has the effects as discussed above.

Further to any of the methods as presented herein according to the present application, the thermoplastic polymer, preferably thermoplastic PVA, comprises ester bonded pendant chains of which at least some end into vinyl groups, wherein the pendant chains which end into vinyl groups contain a catenated carbon structure of at least 4 carbon atoms, and the extruded primer layer PRIM1 further comprises carboxylic acid residue, wherein the carboxylic acid residue is organic compound that contains the same kind of catenated carbon structures of at least 4 carbon atoms that end into vinyl group as the pendant chains of the thermoplastic poly(vinyl alcohol) derivative. The carboxylic acid residue has been observed to act as a surfactant on a polymer-coated cellulosic substrate S2. This effect has been observed even when some of the carboxylic acid residue on the extruded primer layer PRIM1 has been neutralized into the corresponding carboxylate, i.e. the salt of said carboxylic acid residue. The carboxylic acid residue, when arranged on an extruded primer layer PRIM1 of a polymer-coated cellulosic substrate S2, may be configured to improve the spreading of a subsequent silicone-based composition applicable as a release coating SIL1 on the polymer-coated cellulosic substrate S2. The resulting product, the polymer-coated cellulosic substrate S2, has the effects as discussed above.

Examples of thermoplastic PVA covalently bounded to functional vinyl groups may be represented by chemical formulas denoted as CMP1 in FIG. 6, CMP2 in FIG. 7 and CMP3 in FIG. 8. Examples of carboxylic acid residue may be represented by chemical formulas denoted as RD1 in FIG. 6, RD2 in FIG. 7 and RD3 in FIG. 8.

As illustrated in FIGS. 6, 7 and 8, when an aliphatic organic acid anhydride AH1; AH2; AH3; AH4; AH5 reacts in a condensation reaction in a melt state with a hydroxyl group of thermoplastic poly(vinyl alcohol) PVA1, one of the acyl groups forms an ester bond with the hydroxyl group of the poly(vinyl alcohol) PVA1, while the other acyl group becomes a carboxylic acid residue RD1; RD2; RD3. The formed thermoplastic poly(vinyl alcohol) derivative CMP1;

CMP2; CMP3 thereby comprises ester bonded pendant chains of which at least some end into vinyl groups, wherein the pendant chains which end into vinyl groups contain a catenated carbon structure of at least 4 carbon atoms. Statistically, it is equally likely for either or the acyl groups of the aliphatic anhydride to participate in the ester bond forming condensation reaction. Thus, also the carboxylic acid residue RD1; RD2; RD3 is an organic compound that contains the same kind of catenated carbon structure of at least 4 carbon atoms that end into vinyl group, as the ester bonded pendant chains of the thermoplastic poly(vinyl alcohol) derivative CMP1; CMP2; CMP3.

Further to any of the methods as presented herein according to the present application, the second composition, comprising a thermoplastic polymer covalently bounded to functional vinyl groups, may further comprise one or more additives, such as plasticizers, and/or
one or more non-thermoplastic material, such as starch or carboxymethyl cellulose (CMC).

The use of plasticizers leads to better processability. Examples of such plasticizer are glycol, polyglycol, glycerine or the like. The resulting product, the polymer-coated cellulosic substrate, has the effects as discussed above.

Further to any of the method as presented herein according to the present application, wherein the thermoplastic polymer containing vinyl groups has been formed from a thermoplastic poly(vinyl alcohol), the polymer-coated cellulosic substrate S2 may further comprise a tie layer TIE1 between the first coating layer PO1 and the extruded primer layer PRIM1, said tie layer TIE1 comprising at least one compatibilizer, such as polyolefin grafted with maleic anhydride, acrylic acid, or glycidyl methacrylate.

In some examples, the extruded primer layer PRIM1 may comprise a compatibilizer, such as anhydride modified polyolefin. The anhydride, typically maleic anhydride, reacts with alcohols to form ester crosslinks.

In some examples, the first coating layer PO1 may comprise a compatibilizer, such as anhydride modified polyolefin. The anhydride present on the surface of the first coating layer PO1 reacts with alcohols present in the extruded primer layer PRIM1 to form ester crosslinks, and thus, the adhesion between the extruded primer layer PRIM1 and the first coating layer PO1 is further improved.

Further to any of the methods as presented herein according to the present application, the extruded primer layer PRIM1 has at least one of the following properties:

the PPS roughness value is less than 2 μm,
the thermoplastic polymer covalently bounded to functional vinyl groups has a coat weight in a range of 0.5-10.0 g/m$^2$, preferably 0.5-4.0 g/m$^2$, for example at least 0.6 g/m$^2$, more preferably 1.0-2.0 g/m$^2$,
the extruded primer layer PRIM1 contains functional vinyl groups in an amount of 0.025-20 mmol/m$^2$, preferably 0.05-4.0 mmol/m$^2$, for example at least 0.06 mmol/m$^2$, more preferably 0.15-1.6 mmol/m$^2$,
the thermoplastic polymer contains a vinyl group molality $b_{vin}$ which is equal to or higher than 0.01 millimoles per gram of the thermoplastic polymer, preferably equal to or higher than 0,03 millimoles per gram of the thermoplastic polymer, when determined by iodometric titration method following the standard ISO 3961:2009 (E).

The effects brought by these properties have been described above. The resulting product, the polymer-coated cellulosic substrate, has the effects as discussed above.

Further to any of the methods as presented herein according to the present application, the first coating layer PO1 may comprise polypropylene, or polyethylene such as low density polyethylene (LDPE) and/or high density polyethylene (HDPE), as these polymers are especially suitable for release liners and inexpensive. The extruded primer layer according the present application is applicable to a wide diversity of polymeric coated papers.

In some examples, the polymer-coated cellulosic substrate may further comprise a tie layer TIE1 between the extruded primer layer PRIM1 and the first coating layer PO1. The thermoplastic polymer covalently bonded to functional vinyl groups has been formed from a thermoplastic poly(vinyl alcohol), and the first coating layer comprises a polyolefin, such as a polyethylene, and the tie layer TIE1 comprises polyethylene grafted with maleic anhydride.

Further to any of the method as presented herein according to the present application, the method may further comprise, prior to providing a molten second composition reacting a molten thermoplastic and a grafting agent containing functional vinyl groups, preferably in a solvent-free reaction, thereby obtaining a thermoplastic polymer covalently bounded to functional vinyl groups.

The resulting product, the polymer-coated cellulosic substrate S2, has the effects as discussed above.

Further to any of the methods as presented herein according to the present application, wherein the thermoplastic polymer covalently bounded to vinyl groups has been formed from a thermoplastic poly(vinyl alcohol), may further comprises at least one compatibilizer, so that at least one of the first coating layer PO1 and the extruded primer layer PRIM1 further comprises at least one compatibilizer, being polyolefin grafted with maleic anhydride, acrylic acid, or glycidyl methacrylate; and additionally or alternatively,
the polymer-coated cellulosic substrate S2 further comprises a tie layer TIE1 between the first coating layer PO1 and the extruded primer layer PRIM1, said tie layer TIE1 comprising at least one compatibilizer, such as polyolefin grafted with maleic anhydride, acrylic acid, or glycidyl methacrylate.

In some embodiments, the extruded primer layer PRIM1 comprises a compatibilizer, such as anhydride modified polyolefin. The anhydride reacts with alcohols to form ester crosslinks.

In some examples, the first coating layer PO1 comprises a compatibilizer, such as anhydride modified polyolefin. The anhydride present on the surface of the first coating layer PO1 reacts with alcohols present in the extruded primer layer PRIM1 to form ester crosslinks, and thus, the adhesion between the extruded primer layer PRIM1 and the first coating layer PO1 is further improved.

Further to any of the methods as presented herein according to the present application, the step of extruding the molten second composition, or the step of co-extruding at least the molten first composition and the molten second composition, includes co-extruding a molten third composition, thereby forming an adhesion promoted layer comprising the third composition between the first coating layer PO1 comprising the first composition and the extruded primer layer PRIM1 comprising the second composition.

Further to any of the methods as presented herein according to the present application, a step of providing the molten second composition is performed:

heating thermoplastic poly(vinyl alcohol) having hydroxyl groups, wherein the thermoplastic poly(vinyl alcohol) has been dried and has a degree of hydrolysis in the range of 65 to 95 mol-%, and admixing grafting agent with the thermoplastic poly(vinyl alcohol), wherein said grafting agent is an organic acid anhydride having at least a chain which has a catenated carbon structure of at least 4 carbon atoms and which ends into a vinyl group, such that a mixture is obtained which contains molten thermoplastic poly(vinyl alcohol) having hydroxyl groups and organic acid anhydride which contains chains which end into vinyl groups, and mixing the mixture at a temperature which is above the melting point of the mixture, thereby causing a reaction in a melt state, wherein at least some of the organic acid anhydride reacts with the hydroxyl groups of the thermoplastic poly(vinyl alcohol) in an ester bond forming condensation reaction, such that reaction product, being the second composition, is formed which contains carboxylic acid residue of the ester bond forming condensation reaction, wherein at least some of said carboxylic acid residue contains chains which end into vinyl groups, and thermoplastic poly(vinyl alcohol) derivative which contains ester bonded pendant chains of which at least some end into vinyl groups.

Examples of providing the molten second composition may be illustrated by the Chemical equations in FIG. 6 to FIG. 8.

Typically, a temperature in a range of 170 to 210° C. may be used for the condensation reaction. The suitable temperature range is limited from the lower end by the melting point of the thermoplastic poly(vinyl alcohol) PVA1 and the mixture. The suitable temperature range is limited from the upper end by the decomposition temperature of the poly(vinyl alcohol) PVA1 and/or its derivative. Most preferably, said temperature is in a range of 170 to 190° C., which reduces the likelihood of thermal decomposition of the thermoplastic poly(vinyl alcohol) PVA1 and/or its derivative. The reaction in a melt state is preferably carried out without adding a solvent. The lack of added solvents enables a small reaction volume. The duration of the reaction in a melt state may be less than 5 minutes, preferably less than 1 minute, more preferably less than 20 seconds. If desired, an inhibitor may be used to inhibit spontaneous radical polymerization of vinyl groups and/or to inhibit a cross-linking reaction of the thermoplastic poly(vinyl alcohol) PVA1 and/or its derivative. An example of such an inhibitor is butylated hydroxytoluene, which can act as a free radical scavenger that suppresses radical reactions, such as polymerization and cross-linking. Further, if desired, a homogeneous or heterogeneous catalyst may be used to accelerate the ester bond forming condensation reaction. A suitable catalyst may be, for example, a Bronsted acid (e.g. sulfuric acid), a Lewis acid (e.g. tin(II) octoate), or a Bronsted/Lewis base (e.g. alkaline metal alkoxide or carbonate). Further, pyridine may be used as such a catalyst. A preferred catalyst is 1-methylimidazole, which has a high catalytic activity, which is in the range of $4 \times 10^2$ times higher than the catalytic activity of pyridine.

If desired, at least some of the carboxylic acid residue in the reaction product may be neutralized with an alkaline reagent, such as NaOH, thereby forming a salt of the carboxylic acid residue, i.e. a carboxylate.

The thermoplastic poly(vinyl alcohol) derivative contained in the reaction product may have a degree of hydrolysis in the range of 60% to 90%. The thermoplastic poly(vinyl alcohol) derivative contained in the reaction product may further have a melt flow index in a range of 0.5-300 g/10 min. The melt flow index may be determined according to standard ISO 1133-1:2011 (210° C., 2.16 kg) with a melt point measuring device, or alternatively by using a differential30 scanning calorimetry method.

A melt state reaction, in contrast can be done in large volumes with a compact device, in a short span of time which enables centralized production and easy distribution of solid, water soluble reaction product to paper manufacturing sites all over the world.

The polymer-coated cellulosic substrates (S2) and the methods for manufacturing the polymer-coated cellulosic substrates (S2) are especially suitable for release liners. It is thus provided also release liners comprising the polymer-coated cellulosic substrates according to the present application, or the polymer-coated cellulosic substrates obtainable by the methods according to the present application, and a silicone coating layer on top of the polymer-coated cellulosic substrate.

Examples

Example 1: Melt State Reaction of Poly(Vinyl Alcohol) with 10-Undecenoyl Anhydride An experimental study was carried out, wherein a mixture containing thermoplastic polyvinyl alcohol and 10-undecenoyl anhydride was arranged to react in an ester bond forming condensation reaction in melt state such that reaction product containing thermoplastic polyvinyl alcohol derivative and carboxylic acid residue was obtained. 10-undecenoyl anhydride is a symmetrical anhydride condensed from two 10-undecenoic acid molecules having a vinyl group at the end. 10-undecenoyl anhydride therefore has two chains which have a catenated carbon structure and which end into a vinyl group. The amount of 10-undecenoyl anhydride that was admixed with the thermoplastic polyvinyl alcohol was 5 wt.-%, determined of the total weight of the mixture. The reaction was carried out using a twin-screw extruder (Brabender®, counter-rotating, 32 mm screw diameter, 330.7 mm screw length) which contained a feeding unit, three heating zones and a die zone for extruding the material.

In the experimental study, an amount of 1.9 kg of thermoplastic polyvinyl alcohol (Kuraray POVAL® 3-80 grade) having a degree of hydrolysis of 80 mol-% was first dried in an oven at a temperature of 60° C. for 24 hours, thereby obtaining dry thermoplastic polyvinyl alcohol. The dry thermoplastic polyvinyl alcohol was then fed via the feeding unit to the extruder, together with 0.1 kg of 10-undecenoyl anhydride. The extruder screws were rotated at 30 rpm. The three heating zones were adjusted to have a temperature profile that provided smooth runnability. The first heating zone adjacent to the feeding unit had a temperature of 190° C., the second heating zone had a temperature of 190° C., as well, and the third heating zone had a temperature 195° C. The extrusion die zone was set to have a temperature of 200° C. Thus, the 10-undecenoyl anhydride was reacted in an ester bond forming condensation reaction with the thermoplastic polyvinyl alcohol in a melt state, yielding thermoplastic polyvinyl alcohol derivative which contained ester bonded 10-undecenoyl groups. The reaction product was extruded through the die and air cooled below the melting point of the mixture and granulated to form a solid reaction product, i.e. an extrudate. In the following examples, said extrudate is denoted as mPVA.

Example E1: A Polymer-Coated Cellulosic Substrate Made by Extrusion Coating of mPVA on PE-Coated Kraft Paper A commercially available PE-coated Kraft paper sheet was provided. The Kraft paper without PE coating had the following properties:

| Kraft paper | |
| --- | --- |
| Basis weight | 80 g/m$^2$ |
| Caliper | 90 μm |
| Bendt. Roughness T | 133 ml/min |
| Bendt. Roughness B | 140 ml/min |
| Opacity | 81.7% |
| Brightness, D65 | 87.5 |
| Tensile Streng. MD | 8.3 kN/m |
| Tensile Streng. CD | 3.1 kN/m |
| Tear strength MD | 652 mN |
| Tear strength CD | 838 mN |

The coat weight of PE coating was 10 g/m$^2$ on one side of the Kraft paper.

The mPVA, obtained from Example 1, in pellet form was dried in vacuum at 65° C. for 16 h prior to extrusion. Pellets were fed from a hopper to an extruder having a narrow film die able to apply polymer melt on the surface of a passing film moving from unwinder to rewinder. The PE-coated Kraft paper travelled past the extruder die opening and continuing via chill roll nip to rewinder. The die extruded the mPVA vertically through a narrow slot to form a thin low viscosity coating of a melt of uniform thickness that uniformly coats the PE-coated Kraft paper which was continuously moving at a speed of 2.5 m/min past the extruder die slot. The coated PE-coated Kraft paper passed through a nip between the pressure roll and a chill roll. The nip pressure applied by the pressure roll provides smoothing of the exposed face of the coating. The extruded coating was immediately cooled by contact with the chill roll which hardened the extruded coating, thereby obtaining a polymer-coated cellulosic substrate comprising an extruded primer layer of mPVA on a first coating of polyethylene on Kraft paper.

The coat weight of mPVA used was 4 g/m$^2$, corresponding to vinyl groups in density of 0.68 g/m$^2$.

Example E2: A Polymer-Coated Cellulosic Substrate Made by Coextrusion of Polypropylene and mPVA, on Kraft Paper The mPVA, obtained from Example 1, and commercially available polypropylene (Moplen EP 310D HP), in pellet form were provided as starting material.

The polymers were dried in a vacuum oven at 65° C. for 16 hours prior to extrusion. A film extruder suitable for extruding 1-3 layers comprised three extruders, a three-channel feed block, a film die, a cooling cylinder, orientation unit and a rewinder. The extruders had single screws with diameters of 30, 45, and 30 mm and respective L/d ratios of 30, 25, and 30. Feed rates of all components were controlled by a gravimetric feed regulator. The polypropylene was fed into a large extruder and mPVA was fed into a small extruder. The extruders had ten heating zones that were adjusted to a steadily increasing temperature profile. A range of 225-235° C. was used for polypropylene and 150-200° C.

for mPVA. The film nozzle was adjusted to 230° C. Polymer melt feeds from all extruders converged in the feed block and passed through the nozzle fused together as a single film. Feed rates of polypropylene and mPVA were 10 and 2 kg/h, respectively.

A commercially available Kraft paper, having the properties as shown in Example E1, was provided.

The extruded single film was coated on the Kraft paper which was continuously moving at a speed past the extruder die slot. The coated Kraft paper passed through a nip of the pressure roll and a chill roll. The nip pressure applied by the pressure roll provides smoothing of the exposed face of the coating. The extruded coating was immediately cooled by contact with the chill roll set to 55° C. which hardened the extruded coating, thereby obtaining a polymer-coated cellulosic substrate comprising an extruded primer layer of mPVA on a first coating of polypropylene on Kraft paper. The thickness of co-extruded first coating layer and the extruded primer layer was 45 μm, and the extruded primer layer containing the mPVA had a coat weight of 8.9 g/m$^2$ and a vinyl group density of 1.5 mmol/m$^2$.

Example E3: A Polymer-Coated Cellulosic Substrate Made by Coextrusion of PE, mPVA and a Compatibilizer, on Kraft Paper The mPVA, obtained from Example 1, and commercially available polyethylene (CA9150), and commercially available PE-MAH (Dow Amplify GR 204), in pellet form were provided as starting material.

The procedure of coextrusion on paper was repeated as in the Example E2, except that a polyethylene was used instead of polypropylene, and a third composition of PE-MAH (polyethylene grafted with maleic anhydride) based compatibilizer (Dow Amplify GR 204) was also coextruded as a tie layer, to produce a three-layered film. Temperature ranges were 190-220° C. for PE, 180-205° C. for PE-MAH, and 150-200° C. for mPVA. Film nozzle was adjusted to 230° C. Feed ratios were 10 kg/h for PE, 4 kg/h for PE-MAH, and 2 kg/h for mPVA. Final film thickness was 45 μm and the extruded primer layer containing the mPVA had coat weight of 6.7 g/m$^2$ and had vinyl group density of 1.2 mmol/m$^2$.

Comp. Example C1: A Polymer-Coated Cellulosic Substrate Made by Coextrusion of PP, a Compatibilizer and Unmodified PVA, on Kraft Paper The coextrusion was repeated as in the Example E3, except that commercially available PVA (Poval 3-80) was used instead of mPVA of Example 1. Same film extruder was used to coextrude PE, PE-MAH and PVA (Poval 3-80) to obtain a three-layer film. The PVA layer had coat weight of 6.7 g/m$^2$ and had no vinyl groups.

Example 3: A Method to Determine Silicone Adhesion

The polymer-coated cellulosic substrates obtained from Examples E1, E2, E3, and C1 were subject to siliconization.

Siliconization refers to coating of a substrate with silicone resin prepared of Wacker Dehesive SFX 251 and V58 cross-linker, using C05 catalyst (all components provided by Wacker). The silicone resin applied on the paper substrate was prepared by stirring 100 parts per weight of the Dehesive SFX 251 with 11.9 parts of the V58 cross-linker for 2 minutes, then adding 2.5 part of the C05 platinum catalyst and stirring for 5 minutes. The silicone resin thus prepared was then applied on top of the substrate by a laboratory blade coater and cured for 1 minute at 105° C., thereby curing the silicone resin into a release layer and forming a release liner. Each sample sheet was coated with an amount of approximately 0.7 g/m² of the silicone resin thus prepared.

The anchorage of silicone coating on the samples were tested using rub-off test. Anchorage is a term used in the field to describe the attachment of the release coating to the substrate. Rub-off test is for testing the ability to remove, under applied pressure, the silicone release coating from the substrate onto which it is coated. The samples were tested by a manual rub test with a piece of rubber. The silicone adhesion was tested immediately after the siliconization from the formed release liner.

The results are listed in the table below. The adhesion scale is indicated by Number 1, 2 and 3. "1" indicates that the silicone withstood strong rubbing without detaching; "2" indicates that the silicone surface was smeared after strong rubbing; "3" indicates that the silicone detached after strong rubbing.

| Sample | rub-off |
| --- | --- |
| Example E1 | 2 |
| Example E2 | 2 |
| Example E3 | 1 |
| Example C1 | 3 |

The invention claimed is:

1. A polymer-coated cellulosic substrate for a release liner, comprising
   a cellulosic support layer,
   a first coating layer comprising a first composition containing polyolefin,
   an extruded primer layer comprising a second composition containing a thermoplastic polymer covalently bonded to functional vinyl groups;
   wherein the first coating layer is situated between the cellulosic support layer and the extruded primer layer,
   wherein the thermoplastic polymer covalently bonded to functional vinyl groups has been formed from a thermoplastic polyvinyl alcohol having a degree of hydrolysis in the range of 65 to 95 mol %.

2. The polymer-coated cellulosic substrate according to claim 1, further comprising a tie layer between the first coating layer and the extruded primer layer.

3. A release liner comprising
   the polymer-coated cellulosic substrate according to claim 1 and a silicone coating layer on top of the polymer-coated cellulosic substrate.

4. The polymer-coated cellulosic substrate according to 1, wherein the thermoplastic polymer covalently bonded to functional vinyl groups is a reaction product of a molten thermoplastic and a grafting agent containing functional vinyl groups.

5. The polymer-coated cellulosic substrate according to claim 1, wherein the thermoplastic polymer covalently bounded to vinyl groups comprises ester bonded pendant chains of which at least some end into vinyl groups, wherein the pendant chains which end into vinyl groups contain a catenated carbon structure of at least 4 carbon atoms.

6. The polymer-coated cellulosic substrate according to claim 1, wherein the second composition further comprises
   one or more plasticizers, and/or
   a non-thermoplastic.

7. The polymer-coated cellulosic substrate according to claim 1, wherein the tie layer comprises polyolefin grafted with maleic anhydride, acrylic acid, or glycidyl methacrylate.

8. The polymer-coated cellulosic substrate according to claim 1, wherein the cellulosic support layer comprises fibres of Kraft pulp, and the grammage of the cellulosic support layer is from 35 g/m² to 100 g/m².

9. The polymer-coated cellulosic substrate according to claim 1, wherein the extruded primer layer has at least one of the following properties:
   the extruded primer layer comprising thermoplastic polymer covalently bound to functional vinyl groups has a coat weight of at least 0.6 g/m²,
   the extruded primer layer contains functional vinyl groups in an amount of at least 0.06 mmol/m²,
   the thermoplastic polymer contains a vinyl group molality $b_{ymn}$ which is in the range of 0.05 mmol/g to 2.00 mmol/g determined as millimoles per gram of dry thermoplastic polymer, when determined by iodometric titration method following the standard ISO 3961:2009 (E).

10. The polymer-coated cellulosic substrate according to claim 1, wherein
   the first coating layer comprises polypropylene, or polyethylene, and/or
   the first coating layer comprises a polypropylene and the tie layer comprises polyethylene grafted with maleic anhydride.

\* \* \* \* \*